United States Patent
Bolourchi et al.

(10) Patent No.: US 7,530,422 B2
(45) Date of Patent: May 12, 2009

(54) FORCE AND POSITION CONTROL FOR ACTIVE FRONT STEERING

(75) Inventors: Farhad Bolourchi, Novi, MI (US); Michael J. Augustine, Mayville, MI (US); Brian J. Magnus, Frankenmuth, MI (US); Jon D. Demerly, Byron, MI (US); Sanket S. Amberkar, Ann Arbor, MI (US); Suat A. Ozsoylu, Rochester Hills, MI (US); James Card, Lighthouse Point, FL (US); Karen Boswell, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 540 days.

(21) Appl. No.: 11/204,706

(22) Filed: Aug. 16, 2005

(65) Prior Publication Data

US 2006/0060412 A1 Mar. 23, 2006

Related U.S. Application Data (60) Provisional application No. 60/611,225, filed on Sep. 17, 2004, provisional application No. 60/630,514, filed on Nov. 23, 2004.

(51) Int. Cl.
*B62D 5/04* (2006.01)
(52) U.S. Cl. .................. 180/406; 180/444; 180/446
(58) Field of Classification Search ................ 180/443, 180/444, 446, 402, 403, 405–407
See application file for complete search history.

(56) References Cited

U.S. PATENT DOCUMENTS

| | | | | |
|---|---|---|---|---|
| 3,085,645 | A | * | 4/1963 | Bookout et al. ............. 180/423 |
| 4,871,040 | A | | 10/1989 | Zuraski et al. .............. 180/142 |
| 4,932,492 | A | | 6/1990 | Sauvageot et al. ......... 180/79.1 |
| 5,050,697 | A | | 9/1991 | Umemura ................... 180/141 |
| 5,205,371 | A | | 4/1993 | Karnopp .................... 180/79.1 |
| 5,234,070 | A | | 8/1993 | Noah et al. ................. 180/169 |

(Continued)

FOREIGN PATENT DOCUMENTS

EP 1 342 642 9/2003

(Continued)

OTHER PUBLICATIONS

European Search Report dated Apr. 5, 2006.

(Continued)

*Primary Examiner*—Anne Marie Boehler
(74) *Attorney, Agent, or Firm*—Thomas N. Twome (57) ABSTRACT

A steering system with reduced coupling between a position overlay unit and a torque overlay unit may include a remote valve assembly for controlling a hydraulic assist force or an electric motor for providing torque overlay and electric assist to a rack of a rack and pinion steering system. In one embodiment, the position overlay unit may provide the assist force and the torque overlay unit may provide a motor command signal to the motor of a differential positioned on a steering shaft. In another embodiment, the position overlay unit may provide the motor command signal and the torque overlay unit may provide the assist force. In either embodiment, the position overlay unit may include variable ratio gain that uses a position signal to output a variable ratio command.

9 Claims, 10 Drawing Sheets

U.S. PATENT DOCUMENTS

| | | | | |
|---|---|---|---|---|
| 5,285,867 | A | 2/1994 | Pedersen et al. | 180/321 |
| 5,445,239 | A | 8/1995 | Miller et al. | 180/132 |
| 5,704,446 | A | 1/1998 | Chandy et al. | 180/446 |
| 6,205,371 | B1 | 3/2001 | Wolter-Doll | 700/174 |
| 6,230,839 | B1 | 5/2001 | Elser et al. | 180/417 |
| 6,345,682 | B1 | 2/2002 | Schoffler et al. | 180/441 |
| 6,474,437 | B1 | 11/2002 | Elser et al. | 180/422 |
| 6,547,031 | B1 | 4/2003 | Magnus | 180/444 |
| 6,568,499 | B2 | 5/2003 | Nakazawa et al. | 180/422 |
| 6,575,263 | B2 | 6/2003 | Hjelsand et al. | 180/402 |
| 6,575,265 | B2 | 6/2003 | Richardson et al. | 180/444 |
| 6,678,594 | B2 | 1/2004 | Byers et al. | 701/41 |
| 6,681,881 | B2 | 1/2004 | Andonian et al. | 180/402 |
| 6,871,127 | B2 | 3/2005 | Dominke et al. | 701/43 |
| 6,926,114 | B2 | 8/2005 | Bolourchi et al. | 180/422 |
| 2003/0114969 | A1 | 6/2003 | Dominke et al. | 701/41 |
| 2003/0146038 | A1 | 8/2003 | Mills et al. | 180/422 |
| 2003/0178243 | A1 | 9/2003 | Mosler et al. | |
| 2003/0196849 | A1* | 10/2003 | Menjak et al. | 180/446 |
| 2003/0201136 | A1* | 10/2003 | Ueno et al. | 180/443 |
| 2003/0221900 | A1 | 12/2003 | Bolourchi et al. | 180/446 |
| 2004/0060764 | A1* | 4/2004 | Kanda et al. | 180/402 |

FOREIGN PATENT DOCUMENTS

| | | |
|---|---|---|
| EP | 1 354 787 | 10/2003 |
| EP | 1 359 083 | 11/2003 |
| EP | 1 375 294 | 1/2004 |
| EP | 1 380 490 | 1/2004 |
| WO | WO 02/02389 A1 | 1/2002 |
| WO | 03/055732 | 7/2003 |
| WO | 2004/050455 | 6/2004 |

OTHER PUBLICATIONS

Mr. T. Akita et al.; User Benefits of Active Front Steering Control System; Steer-By-Wire, 6 pages; copyright 1999.

Sae Technical Paper Series; 1999-01-0395; Improvement in Driver-Vehicle System Performance by Varying Steering Gain with Vehicle Speed and Steering Angle; VGS (Variable Geat-Ratio Steering System); International Congress and Exposition, Detroit, MI; Mar. 1-4, 1999; pp. 117-126.

E-Steertm Electric Power Steering, 2 pages, copyright 1998.

Magnasteertm Magnetic Assist Steering, 2 pages, copyright 2001.

* cited by examiner

FORCE AND POSITION CONTROL FOR ACTIVE FRONT STEERING

CROSS REFERENCE TO RELATED APPLICATIONS

This application claims priority to U.S. Provisional Application No. 60/611,225, filed Sep. 17, 2004, and U.S. Provisional Application No. 60/630,514, filed Nov. 23, 2004, both incorporated by reference in their entirety.

FIELD OF THE INVENTION

This invention relates to a steering system, and more particularly, this invention relates to an active front steering system with a capability to independently control driver's effort and positioning of the steerable device.

BACKGROUND

Vehicles require a steering system to control the direction of travel. Steering systems typically include a mechanical linkage or a mechanical connection between a steering input device (e.g. a hand wheel) and the vehicle's steerable device (e.g. road wheels). Thus, mechanical movement of the steering input device causes a corresponding mechanical movement of the steerable device. Movement of such mechanical systems is often power-assisted through the use of hydraulic or electric actuators. These device actuator systems are responsive to a detection of a driver torque and would magnify it to form the power assist torque. An actuator system that can overlay a torque to the road wheels responsive to signals other than the torque coming from the driver, is said to be capable of torque overlay functionality. The torque overlay function would be advantageous toward a pleasing driving experience. For example, the overlayed torque can be in response to a wind gust or a detection of a situation where a vehicle is losing its stability.

Similarly, an increased level of quality and comfort can be achieved with a steering system that can provide a position overlay function. Again, the position of the road wheel can be a sum of the driver's position at the hand wheel and a supplementary motion of a device responsive primarily to the hand wheel's motion. This augmentation of position is not referred to as position overlay, unless the incremental position can be responsive to inputs other than from the driver. So, to increase the stability during driving, the position of the front wheels can be controlled actively by overlaying an incremental position to that of the driver once a potential danger is detected via vehicle state sensors and/or other sensors detecting wind gust, road crowns, etc. Tunable and customer selectable variable ratio steering and driver effort can be achieved with some existing steering systems, yet these functions are less reaching capabilities since outcomes (variable effort or variable ratio steering) are directly functions of driver input torque and position.

As one achieves torque or position overlay functionalities, one could find that the other be adversely affected. For example, a position overlay system that helps with a vehicle's stability may subjectively deteriorate the torque felt by the driver and thus the torque overlay functionality. Current steering systems that are capable of active control (torque and position overlay) of the front wheels (with varying degrees of success) are "steer-by-wire" (SBW) and "active front steer" (AFS).

"Steer-by-wire" systems typically replace the mechanical linkage between the steering input device and the steerable wheels with an electrically assisted system equipped with sensors that monitor and implement the driver's intent.

For example, a position sensor will detect the displacement of the steering input device and send an electrical signal to a controller. Based upon the electrical signal, the controller activates an output device (actuator) that is attached to the vehicle's steerable device. Steerable devices include, for example, the road wheels of an automobile, the skis of a snowmobile, the nozzles or jets of a jet ski, the propellers of a boat, and the like. Thus, the controller controls the output device to adjust the position of the steerable device based upon the displacement and/or the position of the input device.

Compared to steer-by-wire systems, the mechanical linkage will have a positive effect on the acceptance of the technology from various points of view, including psychological. Therefore, a natural migration is expected from systems with mechanical linkage to steer-by-wire systems. The systems with mechanical linkage are expected to spend less energy than steer-by-wire systems since the driver provides some assist to the system and most of the road feed back is mechanically supplied back to the driver. In steer-by-wire, the system provides all of the power to position the front wheels and all of the power to provide road feel to the driver.

This migration is being made, however, to improve vehicle performance. Namely, because the input device is mechanically decoupled from the steerable device, the steer-by-wire systems eliminate undesirable feedback from the steerable device. The use of steer-by-wire systems can eliminate deleterious feedback to the driver in the form of shudders and kickback from the steerable device. For the time being, the mechanizations in a steer-by-wire system are very expensive due to backup sensors and/or backup actuation systems, and the stringent (in terms of friction, lash, accuracy, etc.) requirements for the sensors and actuator components.

Active front steer is currently designed as a system that augments the front road wheels in series with that of driver input. The AFS system maintains the mechanical link from the road wheel to the driver. Since there is a mechanical connection and it is in series with both the assist control mechanism and the driver input device, torque feedback to the driver during road wheel augmentation is a design challenge. The AFS system works in conjunction with the steering assist system such as hydraulic power steering (HPS) or electric power steering (EPS) and therefore the performance of the steering system is dependent on the performance of the active front steer system and the performance of the steering assist system. Since active front steer provides independent control of the front road wheels, the system achieves performance benefits such as stability, variable ratio, and chassis system integration.

Traditionally, steering systems are designed such that the ratio from hand wheel angle to (front) road wheel angle is fixed. This is known as the overall steering ratio. With the advent of AFS systems, the opportunity exists to dynamically modify (add or subtract) steering angle from the driver's input. For example, when steering angle is added to that of the driver's (i.e. hand wheel) angle, the road wheels are turned more (than what they would have been under fixed ratio). Thus the overall steering ratio is reduced. The consequence of these modifications, however, is a torque that's fed back to the driver (perhaps undesirable). This torque (or force) feedback can be reduced as one increases the assistive power, however, an increase in assist may not be feasible or desirable.

BRIEF SUMMARY OF THE INVENTION

In one exemplary embodiment, a steering system includes an input shaft, a torsion bar moved by the input shaft and providing torque feedback to the input shaft, a differential operatively connected to the torsion bar, a rack and pinion operatively connected to the differential, a primary actuator operatively connected to the rack and pinion for moving the rack, and a secondary actuator operatively connected to the differential.

In another exemplary embodiment, a steering system includes a position overlay unit for applying one of an assist force to a rack and a motor command to a motor, a torque overlay unit for applying the other of the assist force to a rack or the motor command to a motor, and one of an electric power mechanism and a hydraulic power mechanism for providing the assist force to the rack.

Other systems and methods according to embodiments will be or become apparent to one with skill in the art upon review of the following drawings and detailed description.

BRIEF DESCRIPTION OF THE DRAWINGS

The steering system will now be described, by way of example, with reference to the accompanying drawings, in which.

DETAILED DESCRIPTION OF THE INVENTION

Embodiments of the steering systems described herein support advantages of autonomous control of the front wheels and achieve acceptable torque feedback with feasible and less expensive components than current applications. The steering systems described herein can therefore be used for future applications. The mechanizations described within at least some of the steering systems described herein can operate under different modes such as steer-by-wire, active front steering, and electric power steering.

In a mechanically linked steering system, one cannot simultaneously control the position (or force) at both the road wheels and hand wheel. If one chooses to control the force at one end, one will need to control the position at the other end, and visa versa. These control loops, unfortunately, are not independent. The more precise the control on one end has the consequence of a less precise (or desirable) control on the other end. Steering systems are traditionally designed such that the consequence is at least acceptable. For example, in AFS, the hydraulic assist may be modified such that the intended road wheel position is achieved with an acceptable force feedback to the driver. The more that the dependency between force and position can be reduced, the closer a mechanically linked steering system approaches the ideals of a steer by wire system. A steering system that is architectured in such a way that it performs both of these functions (force and position overlay) while naturally reducing or eliminating the coupling between these two actions is highly desirable.

Figure 1:
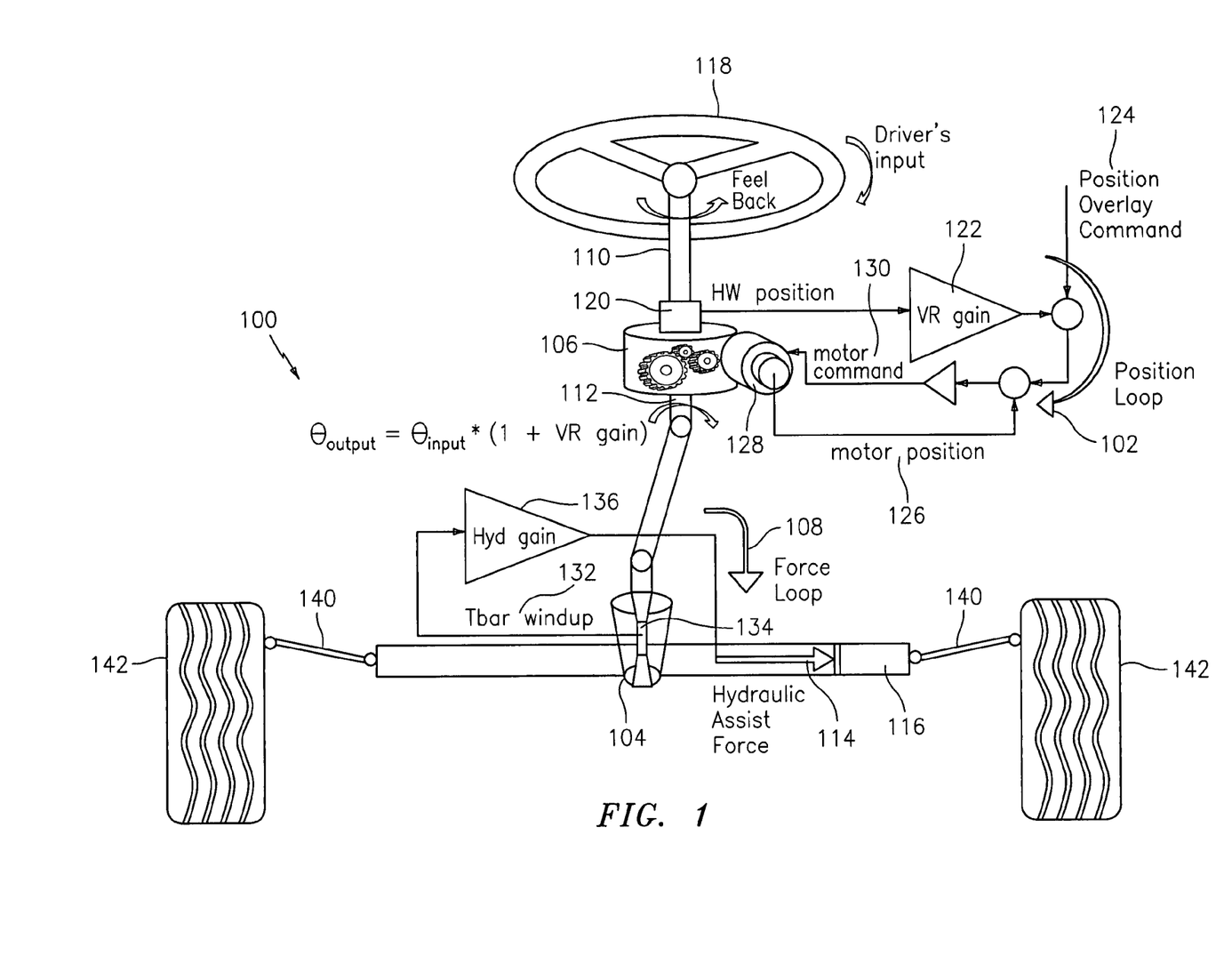
FIG. 1 is a block diagram of a first exemplary embodiment of a steering system.

FIG. 1 shows a first exemplary embodiment of a steering system, steering system architecture 100, with a position overlay unit 102 (position loop) located above a hydraulic valve assembly 104. The angle overlay, referred to as position loop 102, is provided by an AFS actuator including a differential mechanism 106. The position loop 102 includes a position sensor 120 that submits hand wheel position for summing a variable ratio gain command 122 and a position overlay command 124, which may include a vehicle stability command. It should be understood that gain is an increase (or decrease) in strength/power of an electrical signal. It should also be understood that the gain could be a function of signals such as vehicle speed, hand wheel velocity, etc. It should be further understood that the gain need not be limited to a static gain, but can be a dynamic compensator, and also a function of vehicle speed, etc., as previously described. These factors are combined with motor position signal 126 of motor 128 to result in a motor command 130 to the motor 128. The assist, or force augmentation, is provided by the hydraulic system, referred to as force loop 108. The force loop 108 includes the hydraulic valve assembly 104, torsion bar windup 132, which includes a torsion bar 134, for determining the hydraulic gain 136 for providing the hydraulic assist force 114, with the power to do so coming from a hydraulic pump not shown. It is apparent that the action of the AFS actuator, due to its differential nature, is transmitted to its input and output shafts 110, 112. It should be further understood that a differential, as utilized within the embodiments described herein, permits rotation of two shafts, such as shafts 110, 112, at different speeds. The output angle at the output shaft 112 may be written as: $\theta_{output} = \theta_{input} * (1+VR\ gain)$. $\theta_{input}$ refers to the angle at the shaft closer to the hand wheel 118 and $\theta_{output}$ refers to the angle at the shaft closer to the road wheels 142. For one skilled in the art, it will be clear that the above and subsequent equations are true for a differential with an overall mechanical ratio of one. If the overall mechanical ratio were not one, the equations would need to be modified accordingly. The hydraulic system receives the torque, at the output of the AFS actuator including the differential mechanism 106, and provides an assisting force 114 to the rack 116, transmitted, in turn to tie rods 140 and wheels 142, and hence the additional angle requested by the AFS system 106 takes place. Some degree of torque variations, transient and/or steady state, due to the nature of the hydraulic assist, the differential mechanism 106, and the force necessary to rotate the road wheel 142 will be passed from the output shaft 112 of the AFS system 106 to its input shaft 110, and finally to the driver via hand wheel 118. By modifying the hydraulic assist, some level of decoupling between the two actions, i.e. force and position augmentation 102, 108, may be achieved.

Figure 2:
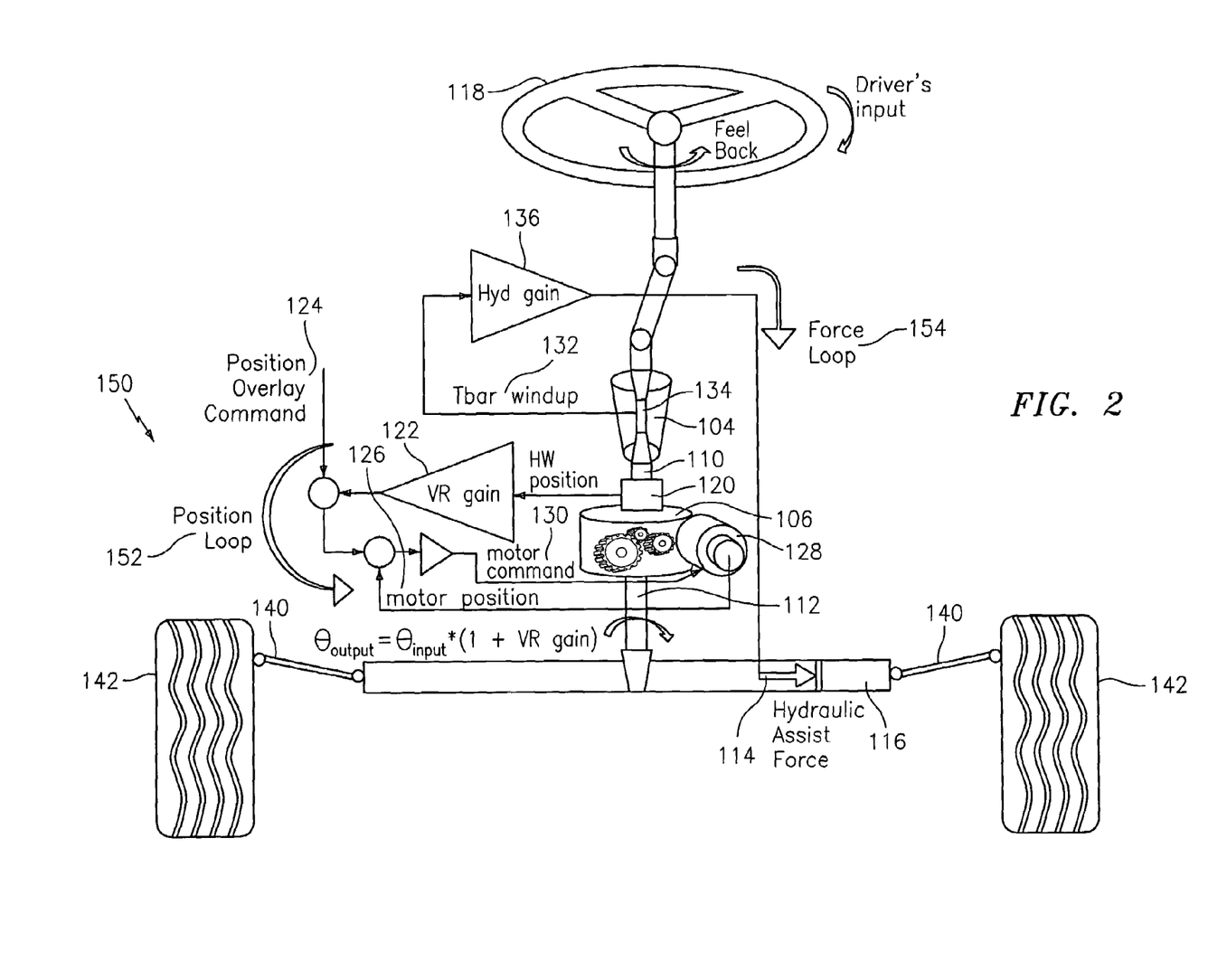
FIG. 2 is a block diagram of a second exemplary embodiment of a steering system, the second exemplary embodiment including a hydraulic steering system.

FIG. 2 shows a second exemplary embodiment of a steering system, steering system architecture 150, with a position overlay unit 152 located below the valve 104. This type of AFS system 150 works similar to the first exemplary embodiment shown in FIG. 1 (system 100) with the exception that the torsion bar 134 located in the valve assembly 104 provides an additional level of isolation, of torque transients, to the driver via the hand wheel 118. As in system 100, the two augmentations, force loop 154 and position (overlay) loop 152, are coupled and a modification of the hydraulic system is needed in order to reduce this coupling.

Figure 3:
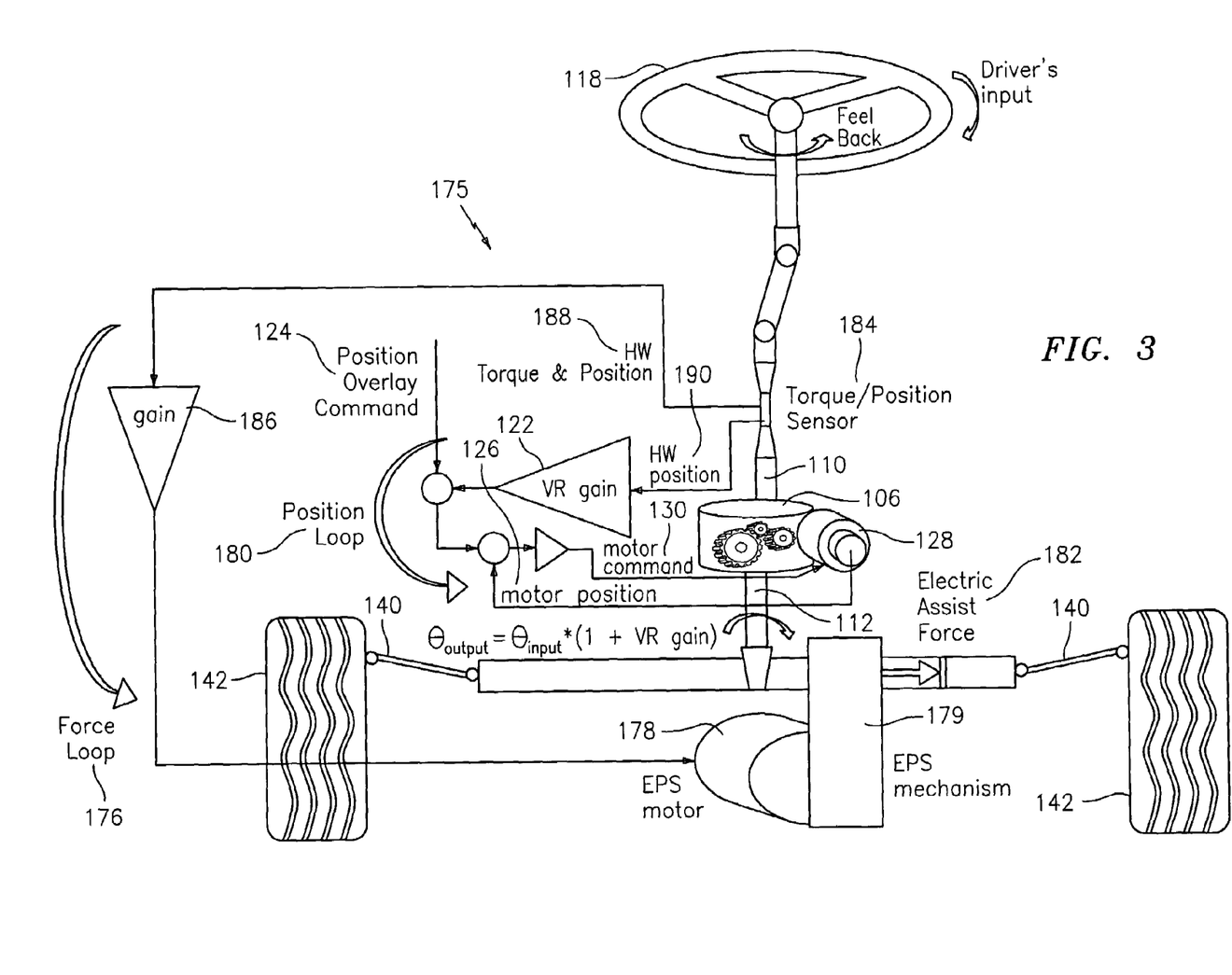
FIG. 3 is a block diagram of a third exemplary embodiment of a steering system, the third exemplary embodiment including an electric steering system.

FIG. 3 shows a third exemplary embodiment of a steering system, steering system architecture 175. Functionally this system 175 is similar to the second exemplary embodiment of FIG. 2 (system 150) except that an electric assist force 182 is provided to the rack 116 instead of a hydraulic assist force 114. Because the force augmentation, force loop 176, is done with an electric motor 178, a larger degree of assist controllability (i.e. the force loop 176) is possible. This means that decoupling between the force and position loops, 176, 180 may be accomplished by easier means (such as through software changes). However, EPS units (specifically 12V systems) may have less maximum force capability than common hydraulic systems. Therefore, this type of architecture may suffer from this shortcoming. It is further noted that the torque sensing and the position sensor of the prior systems 100 and 150 may be replaced by a combined torque and position sensor 184 (shown as Tbar) for providing a hand wheel torque and position signal 188 for processing an effort gain 186 and a hand wheel position signal 190 for processing the variable ratio gain 122. Again it should be understood by one skilled in the art that these gains could also be functions of signals such as vehicle speed, etc.

Figure 4A:
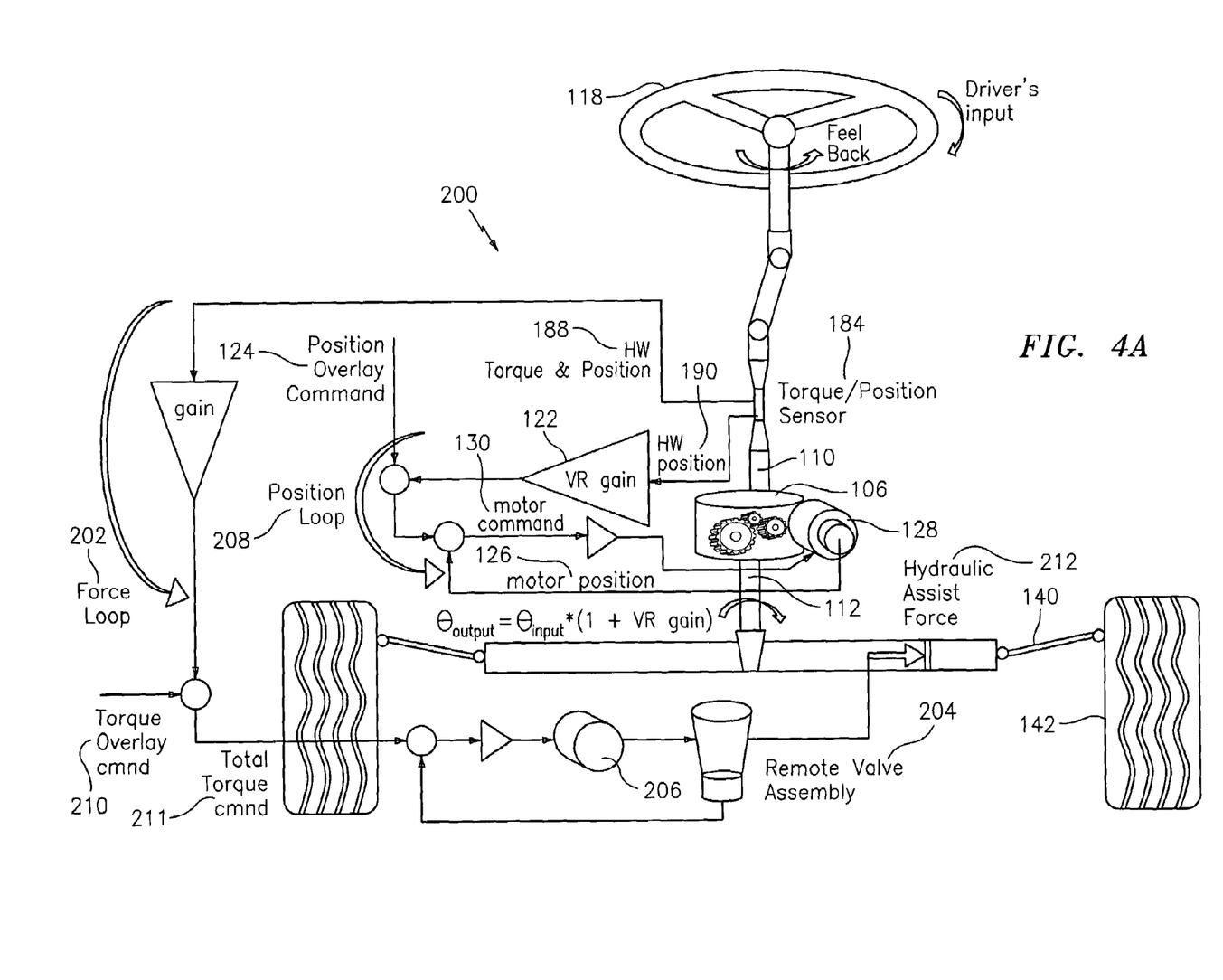
FIG. 4A is a block diagram of a fourth exemplary embodiment of a steering system, the fourth exemplary embodiment including a forward type steering system.

FIG. 4A shows a fourth exemplary embodiment of a steering system, steering system architecture 200. As will be further described, the system 200 includes a position overlay unit 208 between the torque/position sensor 184 and assist apply of a power assist unit, otherwise termed a torque overlay unit, 202. The torque overlay unit 202 applies a hydraulic assist force 212, controlled by a remote electronic valve 204. The system 200 includes a position overlay unit 208 (position loop) similar to the position loop 180 of FIG. 3. It should be understood that in these block diagrams of varying architectures, a circle may identify a summing junction, such as ++ or +−. ++ is when two commands are added to form a final command (e.g. VR and stability commands). +− is when a final command is compared with an actual sensed signal (e.g. motor command with motor actual). It should also be understood that a triangle represents a multiplication or a gain. Thus, the flow of the diagrams should be well understood. In this system 200, the torque overlay 202 (force loop) may be accomplished by hydraulic means with a remote valve 204. The hydraulic power steering system (not specifically shown) includes a remote valve 204 and also includes hydraulic means such as similar to any hydraulic system where a belt driven pump, for example, is attached to the engine with pipes, reservoir, etc. The system 200 further includes an electrical element 206, such as a motor/solenoid. The remote valve 204 is controllable through software. A controller unit (not shown) within the system 200 has the software that controls the remote valve function as well as the position/control loops. Alternatively, dedicated controllers may be used to control the force and position loops separately. In this system 200, the hydraulic power mechanism serves as a primary actuator operatively connected to the rack and pinion (output shaft of the differential 106) for moving the rack, while the motor 128 serves as a secondary actuator operatively connected to the differential 106. Thus, this system 200 enjoys the benefits of electric system 175 shown in FIG. 3, including T-bar isolation and a large degree of assist tunability (and thus decoupling) through software. It should be noted that the T-bar is incorporated in the torque/position sensor. It should also be noted that the output angle at the output shaft 112 may be written as: $\theta_{output} = \theta_{input} * (1+VR \text{ gain})$. For systems that do not have a 1:1 mechanical ratio, constants may be added to the equation, wherein the constants equal one for a system having a 1:1 mechanical ratio. A torque sensor, such as used within torque/position sensor 184, and a remote valve assembly 204 is needed for this architecture 200. Although a combined torque/position sensor 184 is shown, it should be understood that separate torque and position sensors for providing torque and position signals, respectively, are also within the scope of this system. The system 200 may further include a torque overlay command 210 provided to the force loop 202, where the torque overlay command 210 delivers sensed signals, from a source, such as from within the vehicle, that is independent of the driver, that is, not from torque/position sensor 184 or other torque sensor positioned along the steering shaft. Examples of such sources includes accelerometers, yaw sensors, vision sensors, etc. The total torque command 211 is sent to the unit controlling the remote valve 204, which then provides a command to the electrical element 206. It should also be understood that in some circumstances, there may not be a torque overlay command 210 provided to the force loop 202.

Figure 4B:
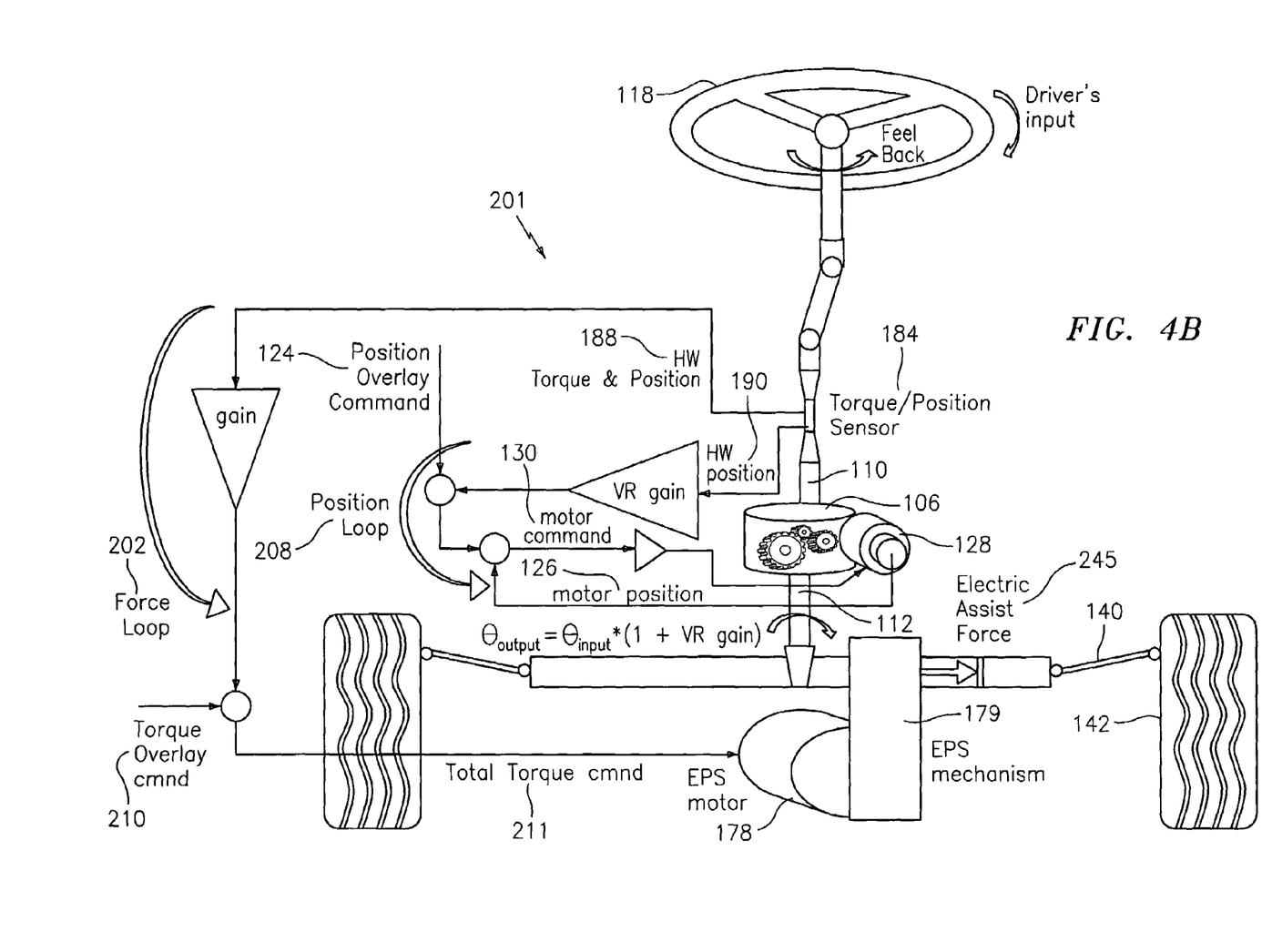
FIG. 4B is a block diagram of an alternative to the steering system of FIG. 4A.

FIG. 4B shows an alternative embodiment of the fourth exemplary embodiment of a steering system, steering system architecture 201. Steering system architecture 201 is substantially the same as steering system architecture 200, with the exception of the employment of an EPS motor 178 and EPS mechanism 179 as a replacement for the remote valve assembly 204 and associated hydraulic power systems ("HPS") of the prior embodiment. Thus, the same reference numerals are used for the same elements, and the detailed descriptions thereof are omitted herein, as they may found in the description of steering system architecture 200. The EPS motor 178 receives the total torque command 211 for operating the EPS mechanism 179 to provide an electric assist force 245 to the rack 116. By example only, the EPS mechanism 179 may include a gear system, a belt system, etc. In this system 201, the electric power mechanism serves as a primary actuator operatively connected to the rack and pinion (output shaft of the differential 106) for moving the rack, while the motor 128 serves as a secondary actuator operatively connected to the differential 106. While this electrically assisting version may be less capable than its hydraulic counterpart, some applications of the steering system architectures shown in FIGS. 4A and 4B may find advantages of utilizing an EPS system over a hydraulic system, such as, but not limited to, greater versatility, less expense, etc.

Figure 5A:
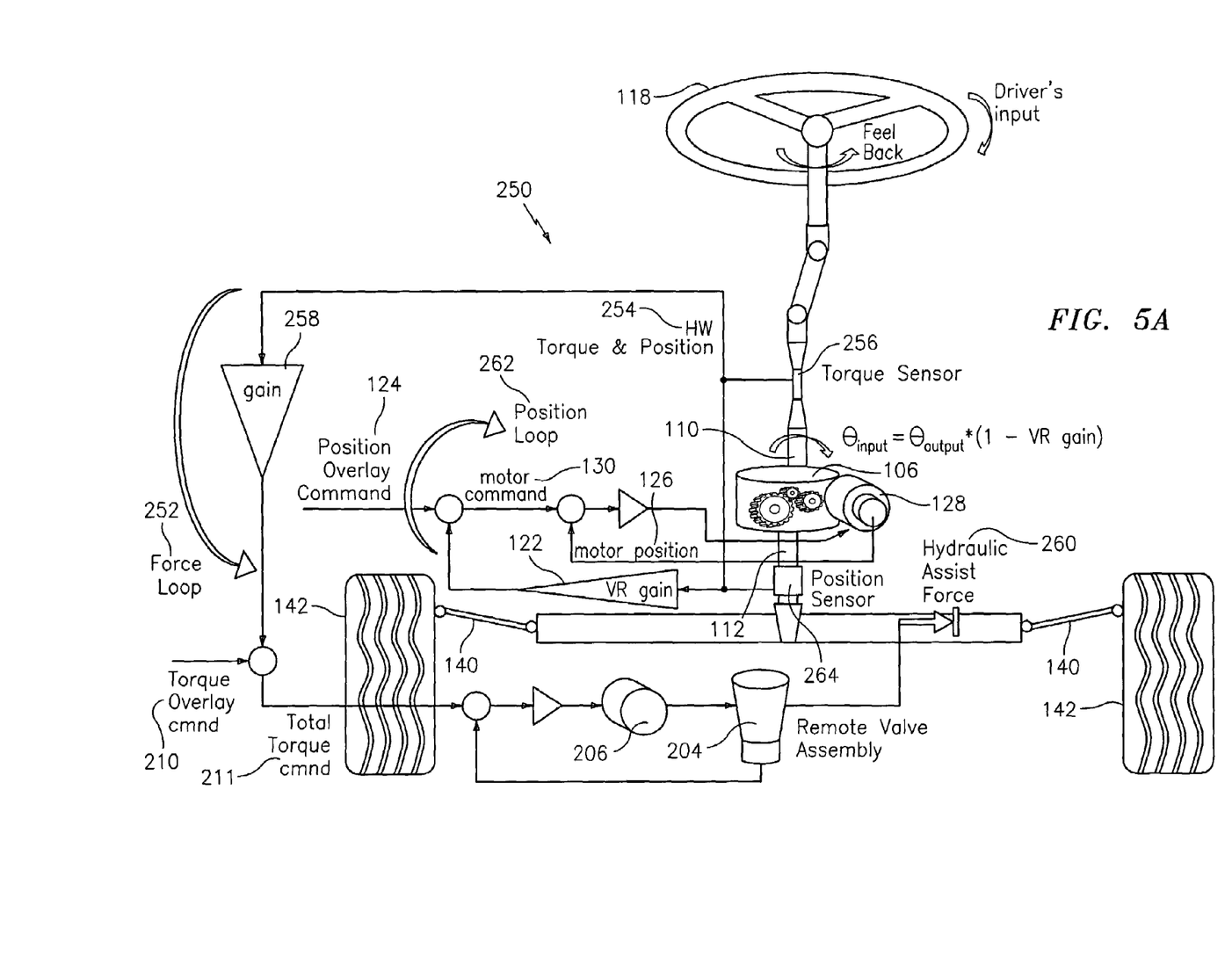
FIG. 5A is a block diagram of a fifth exemplary embodiment of a steering system, the fifth exemplary embodiment including a reversed type steering system.

FIG. 5A shows a fifth exemplary embodiment of a steering system, an AFS architecture 250. As will be further described, this system 250 includes a position overlay unit 262 between force sensing (torque sensor 256) and assist apply of a power assist unit, otherwise termed a torque overlay unit 252. The torque overlay unit 252 applies a hydraulic force 260, controlled by a remote electronic valve 204. The torque overlay unit 252 (force loop) uses hand wheel torque and position signals 254 from a torque sensor 256 positioned on the T-bar and a position sensor 264, and applies the hand wheel signals 254 for processing to form a gain command 258, which is combined with a torque overlay command 210, and the total torque command 211 actuates the remote valve 204 as before. As with the system 200, the torque overlay unit 252 includes a torque overlay (force loop) that, within the illustrated hydraulic embodiment, is accomplished by hydraulic means with a remote valve 204. The remote valve 204 is controllable through software to provide a hydraulic assist force 260. In this system 250, the hydraulic power mechanism serves as a primary actuator operatively connected to the rack and pinion (output shaft of the differential 106) for moving the rack, while the motor 128 serves as a secondary actuator operatively connected to the differential 106. The position overlay unit 262 (position loop) uses a signal from the position sensor 264, positioned on the output shaft 112, for processing to form a variable ratio gain command 122 and uses motor position 126 of motor 128 and motor command 130 from VR gain command 122 to send a signal to the motor 128. It should be noted that the input angle at the input shaft 110 may be written as: $\theta_{input} = \theta_{output} * (1 - VR\ gain)$. For systems that do not have a 1:1 mechanical ratio, constants may be added to the equation, wherein the constants equal one for a system having a 1:1 mechanical ratio. Here $\theta_{input}$ refers to the angle of the input shaft 100 of the differential 106, and $\theta_{output}$ refers to the angle of the output shaft of the differential 106. Functionally, however, $\theta_{input}$ is the result of actuating the motor in response to the $\theta_{output}$ signal. Thus, this system 250 demonstrates an alternative arrangement to the system 200 described with respect to FIG. 4A. The differences between system 200 and system 250 may be minor in terms of results, and any differences may be related to feel and precision. Steering system 250 may feel more natural, but has sensors scattered around compared to steering system 200.

Figure 5B:
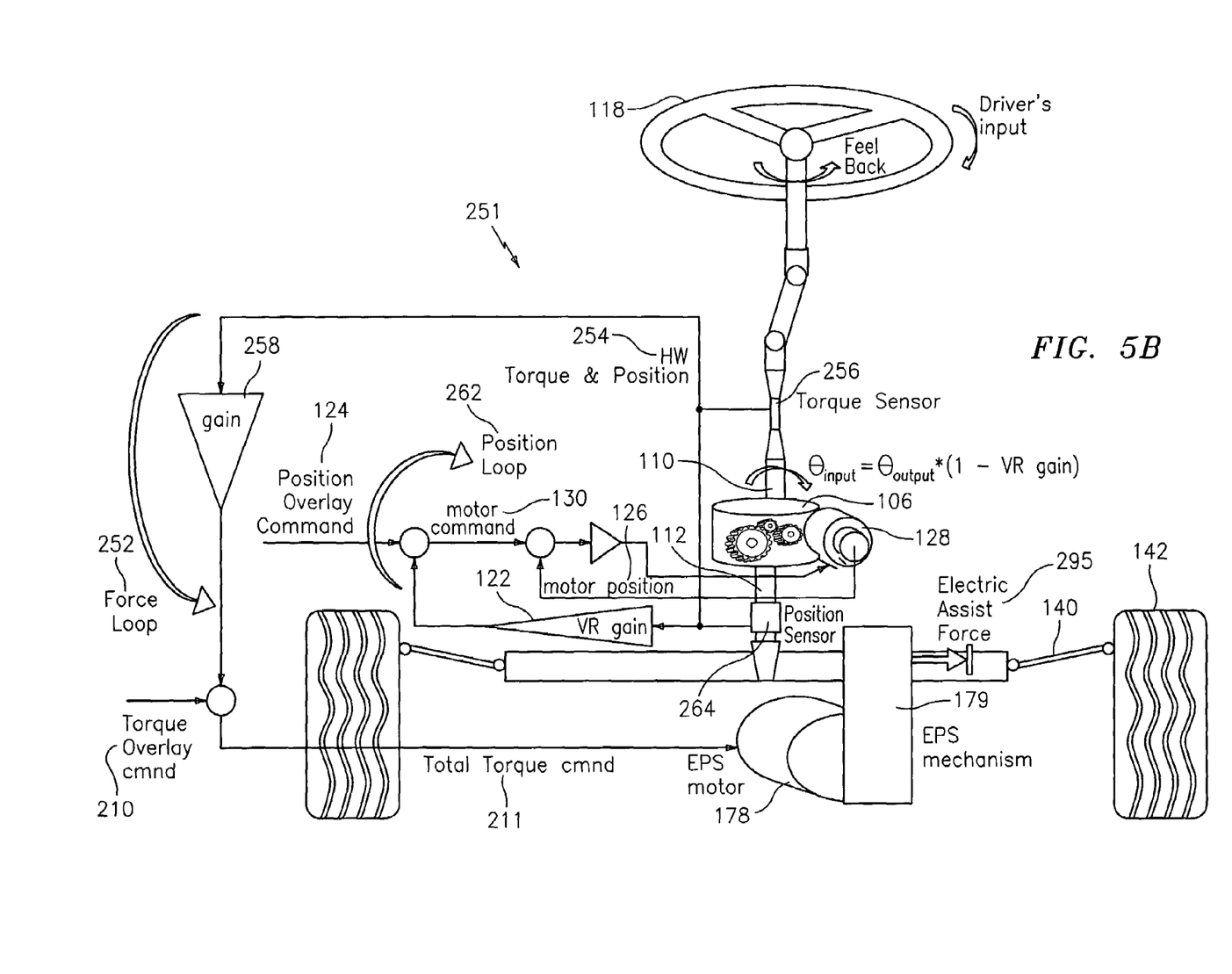
FIG. 5B is a block diagram of an alternative to the steering system of FIG. 5A.

FIG. 5B shows an alternative embodiment of the fifth exemplary embodiment of a steering system, steering system architecture 251. Steering system architecture 251 is substantially the same as steering system architecture 250, with the exception of the employment of an EPS motor 178 and EPS mechanism 179 as a replacement for the remote valve assembly 204 and associated hydraulic power systems ("HPS") of the prior embodiment. Thus, the same reference numerals are used for the same elements, and the detailed descriptions thereof are omitted herein, as they may found in the description of steering system architecture 250. The EPS motor 178 receives the total torque command 211 for operating the EPS mechanism 179 to provide an electric assist force 295 to the rack 116. By example only, the EPS mechanism 179 may include a gear system, a belt system, etc. In this system 251, the electric power mechanism serves as a primary actuator operatively connected to the rack and pinion (output shaft of the differential 106) for moving the rack, which the motor 128 serves as a secondary actuator operatively connected to the differential 106. While this electrically assisting version may be less capable than its hydraulic counterpart, some applications of the steering system architectures shown in FIGS. 5A and 5B may find advantages of utilizing an EPS system over a hydraulic system, such as, but not limited to, greater versatility, less expense, etc.

Figure 6A:
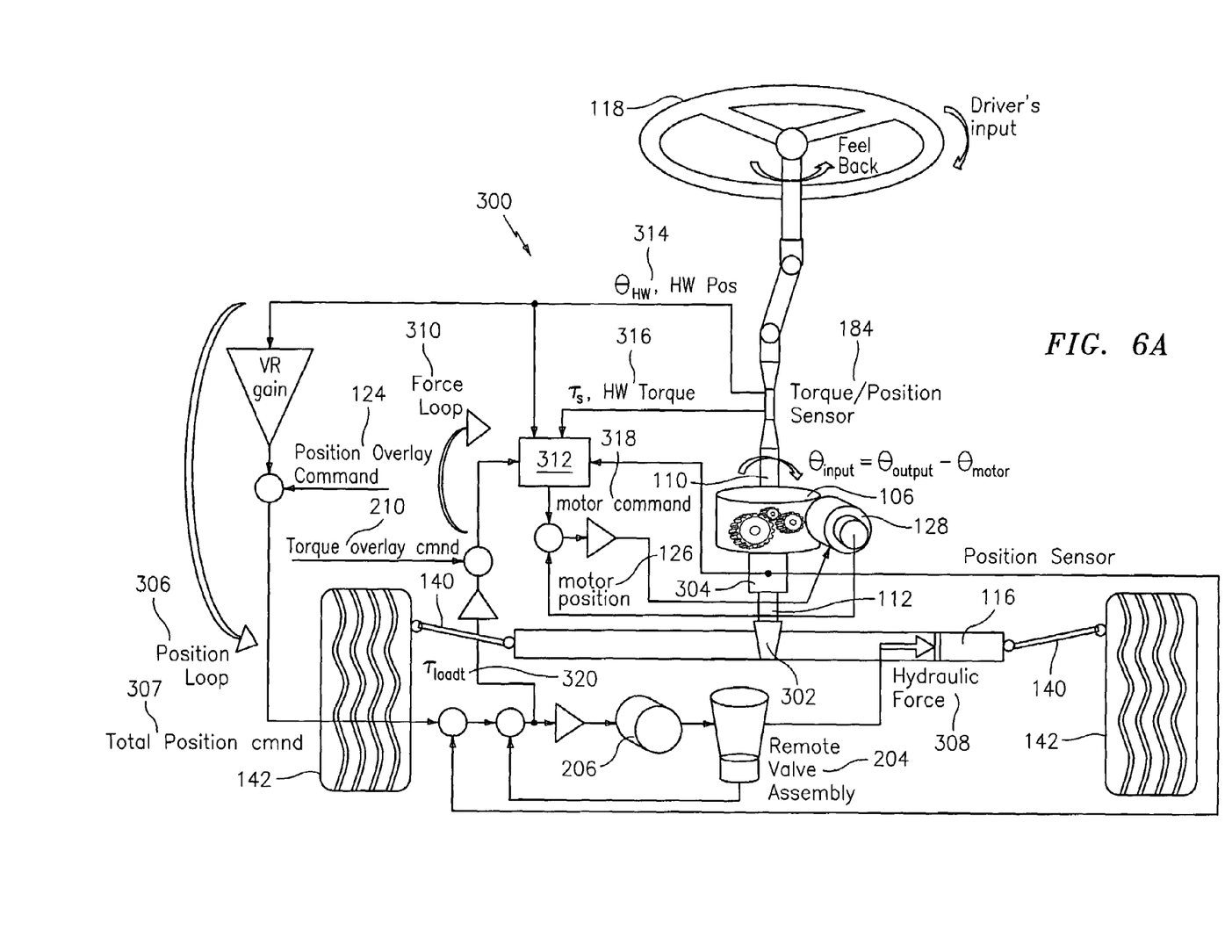
FIG. 6A is a block diagram of a sixth exemplary embodiment of a steering system including a hydraulic power system.

FIG. 6A shows a sixth exemplary embodiment of a steering system, AFS architecture 300. As will be further described, within this system 300, the road wheels 142 are positioned after a differential unit 106 that is operated to produce a torque feedback to the driver via the hand wheel 118 and the road wheel positioning unit, which applies a hydraulic force 308, controlled by a remote electronic valve 204. This system 300 uses almost the same components as the systems 200 and 250, described with respect to FIGS. 4 and 5, yet it functions differently. That is, the hydraulic system with its remote valve 204 is used to position the road wheels 142 responsive to a position command from the driver via hand wheel 118. In this system 300, the hydraulic power mechanism serves as a primary actuator operatively connected to the rack and pinion (output shaft of the differential 106) for moving the rack, while the motor 128 serves as a secondary actuator operatively connected to the differential 106. A position sensor 304 (shown above the pinion 302) measures the effective road wheel angles of the road wheels 142 and is used to close the position loop within position overlay unit 306. The output of the VR gain is summed (overlayed) with the overlay command from the position overlay command 124, for example, to form the total position command 307. This command actuates the remote valve assembly 204 as before. The AFS actuator with its differential 106 that is placed in between the pinion 302 and the driver (hand wheel 118), allows for the fact that the position above the differential 106 (input shaft 110, as set by the driver) and the position below the differential 106 (output shaft 112, as set by the rack 116) would be different. The differential 106 also is used to give the driver a desired torque feedback. It should also be noted that the input angle at the input shaft 110 may be written as: $A*\theta_{input} = \theta_{output} - B*\theta_{motor}$. For systems that do not have a 1:1 mechanical ratio, constants such as A and B may be added to the equation, wherein the constants equal one for a system having a 1:1 mechanical ratio. The force loop uses a control block 312, the main control of the force loop software, to process a hand wheel position signal 314 and a torque signal 316 from the torque/position sensor 184, a position signal from position sensor 304, and a signal from the torque overlay command 210 and information from the remote valve assembly 204 including the load torque (total) 320 $\tau_{loadt}$. The control unit 312 then delivers a motor command 318, and combined with motor position information 126, a signal is delivered to the motor 128.

Figure 6B:
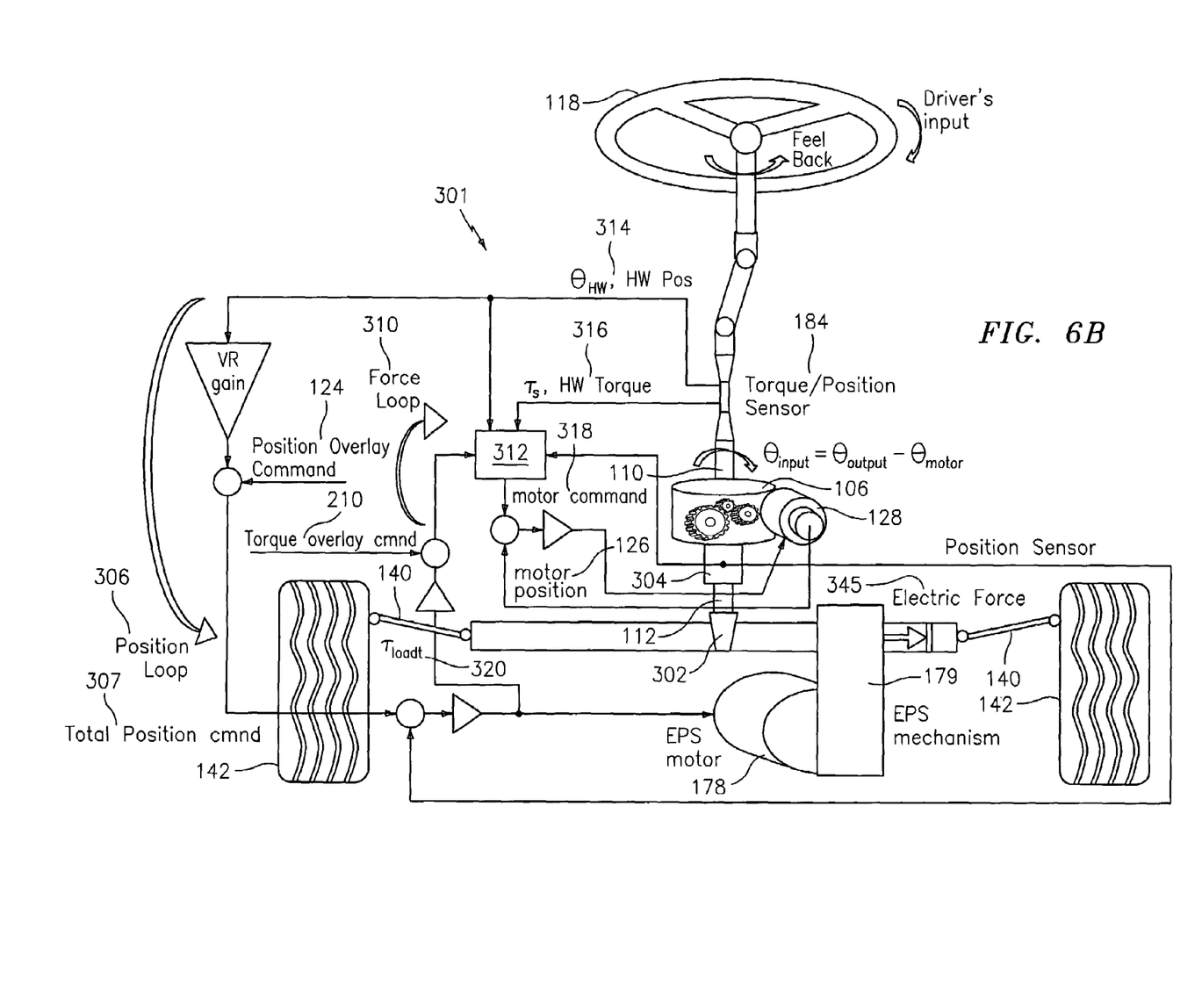
FIG. 6B is a block diagram of an alternative to the steering system of FIG. 6A, the alternative including an electric power system; and, FIG. 7 is a high-level block diagram for control of the steering system of FIG. 6.

FIG. 6B shows an alternative embodiment of the sixth exemplary embodiment of a steering system, steering system architecture 301. Steering system architecture 301 is substantially the same as steering system architecture 300, with the exception of the employment of an EPS motor 178 and EPS mechanism 179 as a replacement for the remote valve assembly 204 and associated hydraulic power systems ("HPS") of the prior embodiment. Thus, the same reference numerals are used for the same elements, and the detailed descriptions thereof are omitted herein, as they may found in the description of steering system architecture 300. The EPS motor 178 receives the total position command 307 from the position loop 306 and a position signal from the position sensor 304 for operating the EPS mechanism 179 to provide an electric assist force 345 to the rack 116. By example only, the EPS mechanism 179 may include a gear system, a belt system, etc. In this system 301, the electric power mechanism serves as a primary actuator operatively connected to the rack and pinion (output shaft of the differential 106) for moving the rack, while the motor 128 serves as a secondary actuator operatively connected to the differential 106. While this electrically assisting version may be less capable than its hydraulic counterpart, some applications of the steering system architectures shown in FIGS. 6A and 6B may find advantages of utilizing an EPS system over a hydraulic system, such as, but not limited to, greater versatility, less expense, etc.

Regarding the differential 106 of the above described embodiments, it should be noted that the differential mechanism 106 is operatively placed between the hand wheel 118 and the rack 116 in order to control the torque that is fed back to the driver and to be able to decouple the rack 116 from the driver. A primary actuator, whether it includes a hydraulic power mechanism or an electric power mechanism, is operatively connected to the rack 116, while a secondary actuator, motor 128, is operatively connected to the differential. The feed-back (both torque and position) to the driver is controlled through the differential 106 and the motor 128.

The non-powered system should also be able to react like a manual steering gear. To achieve such mechanical backup in loss of power situations, the secondary actuator, motor 128, should be stationary while the rest of the steering mechanism in each embodiment moves. Keeping the secondary actuator stationary can be achieved by shorting the leads of the motor 128, such as a brushless permanent magnet motor, or by a brake mechanism that brakes the motor 128 with no power, or a non-back-drivable secondary actuator gearing (such as a worm gear with proper helix angle). Other embodiments of maintaining the motor 128 stationary would also be within the scope of these systems. Further, the primary actuator should be able to back drive at acceptable efforts. Thus, the steering will resume to the same manual steering mode that of the hydraulic assisted steering with hydraulic pressure loss or electric power steering at total power loss.

While various embodiments of the differential mechanism 106 are within the scope of these steering systems, the differential mechanism may include, by example only, a planetary gear system including a sun gear, carrier, ring gear, and planet gear. In this example, the first input to the differential may be the pinion that is connected to the carrier, while the second input to the differential is via the motor 106 that controls the ring gear. By controlling the ring gear and the carrier, the sun gear can be moved to the required position such as via the planet gear.

While the above-described embodiments are illustrated as employing a primary actuator to move a rack 116, it should be understood that the primary actuator may alternatively be operatively connected to the pinion, which in turn moves the rack 116 to achieve similar results.

Figure 7:
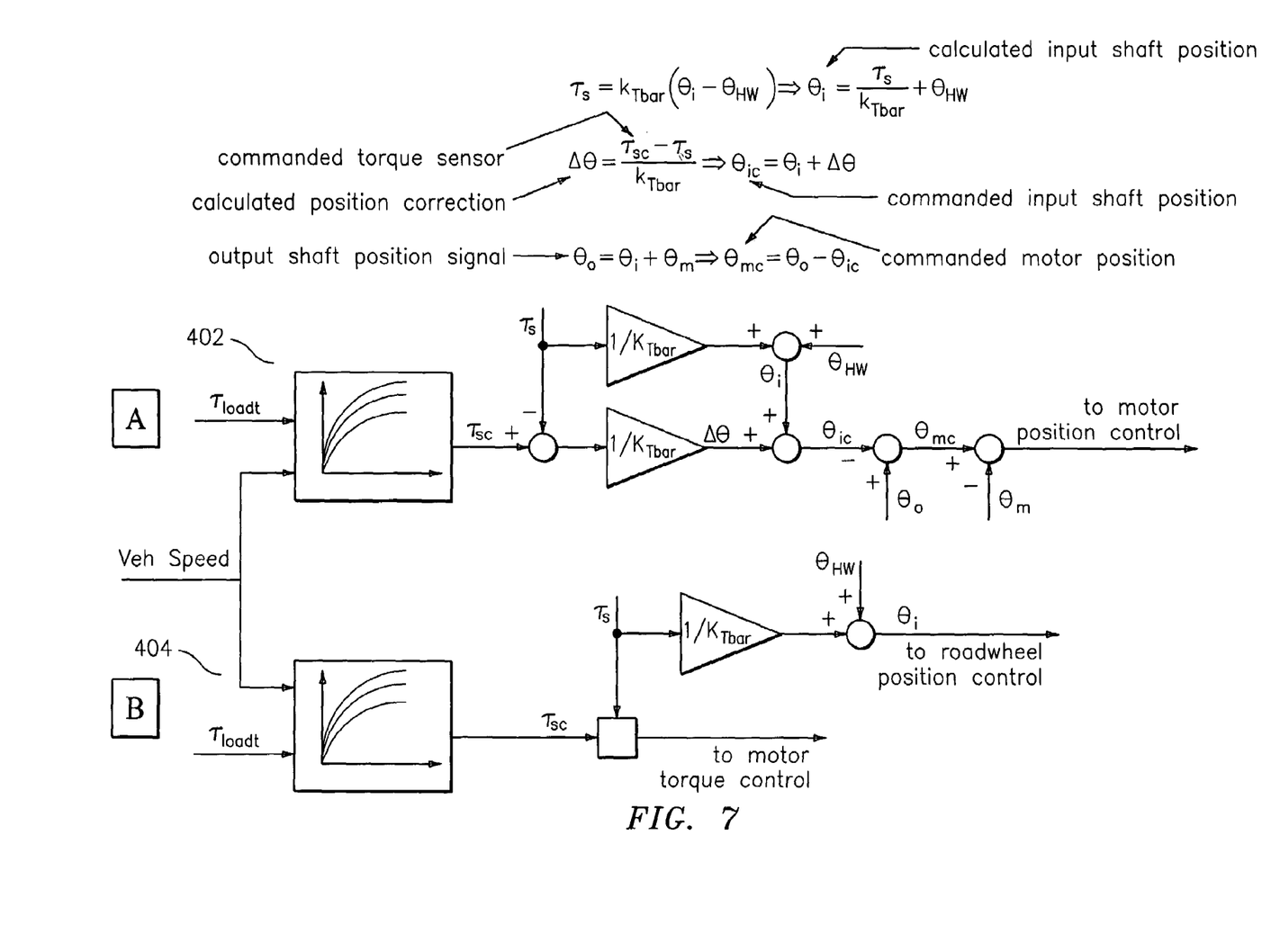

FIG. 7 shows two possible high level block diagrams 402, 404 based on which this torque feedback (i.e. the force loop 310) is accomplished. In both methods, a signal from the rack positioning loop 306 (see FIGS. 6A and 6B) is used as an indication of the load torque 320 $\tau_{loadt}$. This signal in addition to other signals such as vehicle speed is used (in a table, for example) to generate the commanded torque sensor signal $\tau_{sc}$. The control block 312, the formation of $\tau_{sc}$ from $\tau_{loadt}$ signal, the command following algorithm to control the motor 128, and the command following algorithm to control the element 206, all reside in a single electronic control unit, ECU. The block diagrams 402, 404 use the following equations:

$$\tau_s = k_{Tbar}(\theta_i - \theta_{HW}) \Rightarrow \theta_i = \tau_s/k_{Tbar} + \theta_{HW}$$

where $\tau_s$ is the hand wheel torque sensor signal 316, $k_{Tbar}$ is the torsion bar stiffness, $\theta_i$ is the calculated input shaft position, and $\theta_{HW}$ is the hand wheel position sensor signal 314.

$$\Delta\theta = (\tau_{sc} - \tau_s)/k_{Tbar}, \text{ and where } \tau_{sc} = T_{loadt}*g_T + \tau_{overlay},$$

where $g_T$ is a tunable gain which could be a function of vehicle speed, etc. $\Rightarrow \theta_{ic} = \theta_i + \Delta\theta$ where $\Delta\theta$ is the calculated position correction, $\tau_{sc}$ is the commanded torque sensor, $\tau_s$ is the hand wheel torque sensor signal 316, $k_{Tbar}$ is the torsion bar stiffness, $\theta_{ic}$ is the commanded (or desired) input shaft position, and $\theta_i$ is the calculated input shaft position.

$$\theta_o = \theta_i + \theta_m \Rightarrow \theta_{mc} = \theta_o - \theta_{ic}$$

where $\theta_o$ is the output shaft position signal, $\theta_i$ is the calculated input shaft position, $\theta_m$ is the motor position 126, $\theta_{mc}$ is the commanded motor position, and $\theta_{ic}$ is the commanded (or desired) input shaft position.

In method A 402, the calculated position correction $\Delta\theta$ is based on the error between the commanded and actual torque sensor signals, $\tau_{sc}$ and $\tau_s$, respectively, and the stiffness of the torsion bar, $k_{Tbar}$. The calculated input shaft position signal $\theta_i$ is also calculated based on the stiffness of the torsion bar $k_{Tbar}$ and the driver torque, $\tau_s$ and position signal $\theta_{HW}$. The commanded (or desired) input shaft position signal $\theta_{ic}$ is formed by adding the calculated input shaft position signal $\theta_i$ to the calculated position correction $\Delta\theta$. Since the correction $\Delta\theta$ is designed to achieve a desired torque, so will the commanded input shaft position $\theta_{ic}$. Finally, the desired position of the input shaft 110 is achieved by commanding the motor 128 to the position based on the output shaft position signal $\theta_o$, in accordance with the equations shown above. Method A 402 is based on the simple physics of the torsion bar. It attempts to place the input shaft 110 of the differential 106 in a position such that the driver, via hand wheel 118, receives an appropriate feedback. Therefore, the torque feedback (or the torque loop) is achieved by running the motor 128 in position control. Method B 404, on the other hand, gives the torque feedback, by running the motor 128 in torque control. This has historically been more challenging than the position control method. Method B 404 works by feeding the commanded torque sensor signal $\tau_{sc}$ directly (or in a closed loop fashion, based on the torque sensor signal, $\tau_s$) to the motor torque control. It should be noted that in this method 404, the use of the output shaft position sensor 304 is eliminated in the torque feedback loop and it could also be eliminated in the position loop at the rack 116. The calculated input shaft position signal $\theta_i$ is used with reasonable accuracy in place of the output shaft position sensor 304. With this elimination, the components needed to run the steering system 300 architecture may then be identical to that of the steering system 200 (forward), thus advantageously providing for the ability to switch from steering system 300 to steering system 200 with no hardware changes. Conversely, similar sensor reduction schemes can be applied to change the hand wheel torque and position sensor 184 to be only a torque sensor. Then the steering system 300 would use identical components to the steering system 250.

The architectures shown with respect to systems 200, 250, and 300 thus demonstrate an improvement over other systems in that they perform the overlay functions (torque and position), and they perform these more independently and with less inter-coupling, compared to other architectures. This is because they utilize the Tbar isolation and they rely on powerful hydraulic actuation to mask any disturbances. Within the steering systems 200 and 250, the force loop 202, 252 is done at the road wheel 142 and the position loop 208, 262 is done at the hand wheel 118, and thus may be considered more natural (since the flow of power is identical to a typical hydraulically assisted system.) However, in systems 200 and 250, it may not be possible to completely eliminate the driver feedback. This will be the case unless with torque overlay functionality and with an estimate of the load torque, one can set the assist torque to exactly balance out the load torque. If one cannot do that, the residual torque at the pinion will be transferred through the differential and up to the driver. This torque will get smaller as the assist torque is increased (gradually to balance out the load torque). In steering system 300, by floating the carrier (i.e. disengaging the AFS motor) no feedback (other than frictional turning torque) is given to the driver via hand wheel 118, yet the road wheels 142 are positioned per driver's intent. This ability of steering system 300 (to give zero feedback) may not necessarily be desirable, however, it should be noted that this level of decoupling is possible without the reliance on exceeding amount of hydraulic power (as in steering systems 200 and 250, by "exceeding amount" it is meant an amount beyond what is desirable in a typical hydraulic system or the increase is made only to reduce the inter-coupling), or eliminating the mechanical link as in steer-by-wire.

Thus, the duality between the steering systems 200, 250, and 300 may be explored with the same set of components. The differential has first and second inputs and one output. The first input may be operatively connected to a torsion bar or may receive position input from a primary actuator through the differential output shaft (pinion). The second input may be operatively connected to the secondary actuator, i.e. motor 128. Moreover, it may be advantageous to execute both architectures, depending on some vehicle conditions. This degree of freedom along with the other benefits mentioned earlier, makes steering systems 200, 250, and 300 a very desirable architecture for active steering systems.

While the embodiments have been described with reference to exemplary embodiments, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the embodiments not be limited to the particular embodiment disclosed as the best mode contemplated for carrying out the embodiments, but that the embodiments will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A steering system comprising:
a position overlay unit for applying one of an assist force to a rack and a motor command to a motor, wherein the position overlay unit includes a variable ratio gain, the steering system further comprising a position sensor for providing a position signal to the variable ratio gain and further comprising a position overlay command provided to output of the variable ratio gain;
a torque overlay unit for applying the other of the assist force to a rack or the motor command to a motor; and,
one of an electric power mechanism and a hydraulic power mechanism for providing the assist force to the rack, wherein a load torque is sent from a position loop of the position overlay unit to a force loop of the torque overlay unit, and wherein association between the position overlay unit and the torque overlay unit follows the equations:

$\tau_s = k_{Tbar}(\theta_i - \theta_{HW}) \Rightarrow \theta_i = \tau_s/k_{Tbar} + \theta_{HW}$ $\Delta\theta = (\tau_{sc} - \tau_s)/k_{Tbar} \Rightarrow \theta_{ic} = \theta_i + \Delta\theta$ $\theta_o = \theta_i + \theta_m \Rightarrow \theta_{mc} = \theta_o - \theta_{ic}$ where $\tau_s$ is hand wheel torque sensor signal, $k_{Tbar}$ is torsion bar stiffness, $\theta_i$ is calculated input shaft position, $\theta_{HW}$ is hand wheel position sensor signal, $\Delta\theta$ is calculated position correction, $\tau_{sc}$ is torque sensor command based on the load torque, $\theta_{ic}$ is commanded input shaft position, $\theta_o$ is output shaft position signal, $\theta_m$ is motor position, and $\theta_{mc}$ is commanded motor position.

2. The steering system of claim 1 wherein the position overlay unit applies the assist force to the rack, and wherein output from the variable ratio gain is sent to the electric power mechanism or the hydraulic power mechanism.

3. The steering system of claim 2 further comprising a motor attached to a differential connected to a steering shaft of the steering system, wherein the torque overlay unit provides the motor command to the motor.

4. The steering system of claim 3 further comprising a control unit in the torque overlay unit, wherein the control unit receives a hand wheel torque signal from a hand wheel torque sensor and a load torque signal from the position overlay unit, wherein the control unit outputs a motor torque command signal and is combined with a motor position signal from the motor.

5. The steering system of claim 1 further comprising a motor, wherein the position overlay unit provides the motor command to the motor and wherein the position sensor is positioned between a differential associated with the motor and one of a pinion connected to the rack and a hand wheel of the system.

6. A steering system comprising:
a position overlay unit for applying one of an assist force to a rack and a motor command a motor;
a torque overlay unit for applying the other of the assist force to a rack or the motor command to a motor;
one of an electric power mechanism and a hydraulic power mechanism for providing the assist force to the rack; and
a hand wheel and further comprising a differential, the differential having an input shaft and an output shaft, the input shaft mechanically linked to the hand wheel and the output shaft mechanically linked to the rack,
wherein an input angle at the input shaft is $A*\theta_{input} = \theta_{output} - B*\theta_{motor}$, where $\theta_{output}$ is the output angle at the output shaft, $\theta_{motor}$ is a rotor shaft angular position of a motor connected to the differential and A and B are constants, and
wherein an input angle at the input shaft is $\theta_{input} = \theta_{output} * (1-VR\ gain)$, where $\theta_{output}$ is the t angle at the output shaft and VR gain is a variable ratio gain determined from within the position overlay unit using at least one of an output shaft angle signal and a vehicle speed signal.

7. The steering system of claim 6, wherein the torque overlay unit applies the hydraulic assist force to the rack and receives a torque signal from a hand wheel torque sensor and a position signal from a position sensor.

8. The steering system of claim 7 further comprising a gain in the torque overlay unit for receiving the torque and position signals, wherein an output of the gain is combined with a torque overlay command for sending a signal to the remote valve assembly.

9. A steering system comprising:
a position overlay unit for applying one of an assist force to a rack and a motor command to a motor;
a torque overlay unit for applying the other of the assist force to a rack or the motor command to a motor;
one of an electric power mechanism and a hydraulic power mechanism for providing the assist force to the rack; and
a hand wheel and further comprising a differential, the differential having an input shaft and an output shaft, the input shaft mechanically linked to the hand wheel and the output shaft mechanically linked to the rack, wherein an input angle at the input shaft is $A*\theta_{input}=\theta_{output}-B*\theta_{motor}$, where $\theta_{output}$ is the output angle at the output shaft, $\theta_{motor}$ is a rotor shaft angular position of a motor connected to the differential and A and B are constants, and wherein an output angle at the output shaft is $\theta_{output}=\theta_{input}*(1+VR\ gain)$ where $\theta_{input}$ is the input angle at the input shaft and VR gain is a variable ratio gain determined from within the position overlay unit using at least one of a hand wheel position signal and a vehicle speed signal.

* * * * *